United States Patent [19]
Hjorth

[11] Patent Number: 5,358,441
[45] Date of Patent: Oct. 25, 1994

[54] DEVICE FOR HOLDING FLAT FISH DURING PROCESSING

[75] Inventor: Jens Hjorth, Seattle, Wash.

[73] Assignee: Royal Seafoods, Inc., Seattle, Wash.

[21] Appl. No.: 959,385

[22] Filed: Oct. 13, 1992

[51] Int. Cl.⁵ .................................. A22C 25/08
[52] U.S. Cl. .................... 452/180; 452/179; 452/170; 452/149
[58] Field of Search ............... 452/149, 160, 161, 108, 452/170, 179, 180, 166, 177

[56] References Cited

U.S. PATENT DOCUMENTS

| | | | |
|---|---|---|---|
| 2,210,234 | 8/1940 | Durand | 17/4 |
| 2,502,175 | 3/1950 | Savrda | 17/4 |
| 2,576,301 | 11/1951 | Kuther | 17/4 |
| 2,835,918 | 5/1958 | Schlichting | 17/4 |
| 2,920,343 | 1/1960 | Bartels et al. | 17/45 |
| 3,077,632 | 2/1963 | Brandes et al. | 17/45 |
| 3,510,910 | 5/1970 | Erkins | 452/117 |
| 3,793,675 | 2/1974 | Hogan et al. | 17/59 |
| 3,816,876 | 6/1974 | Barnette, Jr. et al. | 17/57 |
| 4,084,293 | 4/1978 | Hogan et al. | 17/52 |
| 4,463,478 | 8/1984 | Hartmann et al. | 17/63 |
| 4,476,610 | 10/1984 | Wenzel | 17/55 |
| 4,551,885 | 11/1985 | Molnar | 17/59 |
| 4,635,318 | 1/1987 | Braeger et al. | 17/52 |
| 4,800,626 | 1/1989 | Wastell | 17/63 |
| 4,956,894 | 9/1990 | Matsubayashi | 452/170 |
| 4,993,116 | 2/1991 | Urushibara et al. | 452/116 |

FOREIGN PATENT DOCUMENTS

| | | | |
|---|---|---|---|
| 0454839 | 3/1949 | Canada | 452/161 |
| 0139383 | 1/1980 | Fed. Rep. of Germany | 452/166 |
| 0214058 | 10/1984 | Fed. Rep. of Germany | 452/180 |
| 1133752 | 4/1957 | France | 452/161 |

*Primary Examiner*—Willis Little
*Attorney, Agent, or Firm*—Christensen, O'Connor, Johnson & Kindness

[57] ABSTRACT

The present invention allows fish processing machinery designed to process pollock or salmon, such as the Baader 182, to be adapted to process flat fish, such as sole. One embodiment of the present invention includes a generally rectangular fish holder that replaces the current fish holders on a fish processing machine. The fish holders include two arms which extend over a portion of the fins and body of a flat fish and hold it in place in the fish holder. The arms include two recesses that have slanted rear walls that center the flat fish as it is placed within the fish holder. Two slots extend across the width of the fish holder to allow a rotating blade to extend beneath the upper surface of the fish holder so as to ensure that the blades cut cleanly through the thickness of the fish. The present invention allows fish processing machinery to hold and center a flat fish so that the head and tail may be cut off to produce various products, such as kirimi.

15 Claims, 8 Drawing Sheets

DEVICE FOR HOLDING FLAT FISH DURING PROCESSING

FIELD OF THE INVENTION

The present invention relates to fish processing equipment, and more specifically, to equipment designed to cut the heads and tails off of flat fish, such as sole.

BACKGROUND OF THE INVENTION

Commercial fishermen catch and process tons of fish a day. Many fishermen have complex, highly automated processing equipment which dress the fish and produce numerous different commercial products for commercial retailers, such as restaurant chains or grocery stores. Such equipment is highly specialized to perform a specific task, such as cutting the heads and tails off, filleting, deboning and skinning, etc. One of the reasons such equipment must be tailored to specific tasks is the large variety of shapes and sizes of fish processed, including pollock, salmon, trout, sole, cod. etc.

To reduce overall processing costs and to improve quality, some commercial fishing vessels include processing equipment and freezers located directly on the ships. As the fish are caught, they are immediately processed and frozen, substantially improving the quality of the final product. This also allows the vessels to remain at sea for long periods of time without transporting the fish to a shore-based processing facility. Most of the processing equipment is large, complex, and expensive. It is difficult and expensive to remove the processing equipment from the vessel and replace it with new processing equipment.

Because of the expense associated with exchanging the processing equipment, including vessel down time, most commercial processing ships are intended to catch and process specific types of fish. As an example, the vessel may be fitted with processing equipment designed to process generally oval fish having a relatively thick cross section, such as pollock or salmon, or generally flat fish having a relatively thin cross section, such as sole. Due to the natural migration of fish, and various fishing laws, individual types of fish are caught and processed during limited parts of the year. Therefore, vessels having equipment capable of processing only one type of fish sit idle during part of the year. If the processing equipment could be readily exchanged or adapted to process both oval fish, such as pollock or salmon, and flat fish, such as sole, the vessels could be operated over a larger part of the year. This would, in turn, reduce the amount of down time and associated expense for the vessels.

One manufacturer of fish processing equipment is Baader GmbH & Co. KG, Lubeck, Germany ("Baader"). One of the many fish processing machines produced by Baader is the Baader 182. The Baader 182 is designed to process pollock and salmon-shaped fish and includes a conveyor having a plurality of fish holders mounted along the length of the conveyor. Each fish holder includes a recess configured to receive a pollock. While operating, a worker removes fish from a fish hopper located next to the conveyor and places an individual pollock in the recess of each fish holder. The conveyor subsequently moves the fish holders and pollock along the length of the conveyor into contact with rotating blades that cut both the head and the tail of the pollock off The body of the pollock is then carried to additional equipment that cuts the pollock into fillets and removes the bones and skin.

The Baader 182 works well with fish having an oval cross section, such as pollock, but does not allow other types of fish to be processed. The Baader 182 is particularly unsuitable for processing fish with a relative flat cross section, such as sole. The fish holders used on the Baader 182 are not capable of holding such fish during processing.

In addition to having a relatively thin cross section, the body of a sole also has a lower length to height ratio than pollock or salmon, i.e., the body is more oval-shaped when viewed from the side. The shape of the sole presents additional problems in processing. The orientation of the body of the sole must be carefully maintained to ensure that the head and tail are removed in such a way as to leave the majority of the body intact. If the orientation of the sole is improper, the sole tends to be cut at angles which either remove too much of the body or leave parts of the head or tail. Therefore it is important that the sole or similarly-shaped fish be carefully centered within the fish holders before being brought into contact with the cutting knives.

Because the fishing seasons for pollock, salmon, sole, or similarly-shaped fish are at different times of the year, it would be beneficial if the processing equipment could process both types of fish. One of the goals of the present invention is to allow current processing equipment to handle both fish having a relatively thick cross section, such as pollock and salmon, and fish having a thin cross section, such as sole. Another goal of the present invention is to allow processing equipment to center flat fish within the fish holders while holding the fish, such that the head and tail may be removed. An additional goal of the present invention is to allow Baader 182 or other processing equipment to be modified from a pollock or similar fish processing configuration to sole or other flat fish processing configuration without substantial difficulty or expense, thus allowing the equipment and vessels to process multiple types of fish.

SUMMARY OF THE INVENTION

The present invention is a fish holder for holding a flat fish during processing. The fish holder holds flat fish so that they may be cut up. In one embodiment of the invention, a flat fish is held so that the head and tail of the fish may be cut off to form a product known as kirimi. The present invention also allows a flat fish to be centered within the fish holder thus helping to ensure that the proper portions of the fish are removed during cutting.

Some current processing machinery designed to process pollock may be retrofitted with the present invention. This allows such machinery to be used for processing pollock and flat fish, as an example, sole. The present invention may be retrofitted to such existing equipment without substantial expenditures of time or money. Use of the present invention allows vessels designed for pollock processing to be easily converted to process flat fish, such as sole. This allows the vessels to be used over a larger portion of the year, thus decreasing down time and associated costs.

One embodiment of the present invention includes a fish holder including a tray having an upper surface upon which a flat fish is placed while being cut up. Holding means extend upwardly from the tray over at least part of the flat fish in order to hold the flat fish on the fish holder. The fish holder also includes centering means for centering the flat fish as it is placed on the fish holder.

According to other aspects of the invention, slot means are located in the upper surface to allow a cutting blade to pass through a portion of the upper surface. This ensures that a cutting blade can pass through the entire thickness of a flat fish placed on the fish holder. Two parallel, horizontally spaced slots allow a cutting blade to pass through the upper surface at two different locations to cut both the head and tail of a flat fish off.

In one embodiment, the holding means includes an arm that extends upwardly from the upper surface to define a recess. A flat fish is placed within the recess in order to hold it on the fish holder. In other embodiments, the holding means includes two arms located near opposite ends of the fish holder. One of the arms extends upwardly over the head of the flat fish while the other arm extends upwardly over the tail of the flat fish.

According to other aspects of the present invention, the centering means includes a recess having a slanted rear wall angled so as to center the flat fish when it is placed on the fish holder. One embodiment includes two recesses located near opposite ends of the fish holder. The rear walls of such recesses are slanted at complementary angles such that the flat fish is centered as it is placed in the fish holder.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings wherein.

DETAILED DESCRIPTION OF THE PREFERRED EMBODIMENT

A preferred embodiment of the present invention will now be described with respect to FIGS. 1–8. The preferred embodiment shown is of a configuration designed to be used with processing equipment similar to the Baader 182 processor sold by Baader GmbH & Co. KG, Lubeck, Germany. Although the present invention is described with respect to a preferred embodiment for use with the Baader 182, it may be used in other configurations designed for use with other processing equipment and is not limited to the embodiment shown.

Figure 1:
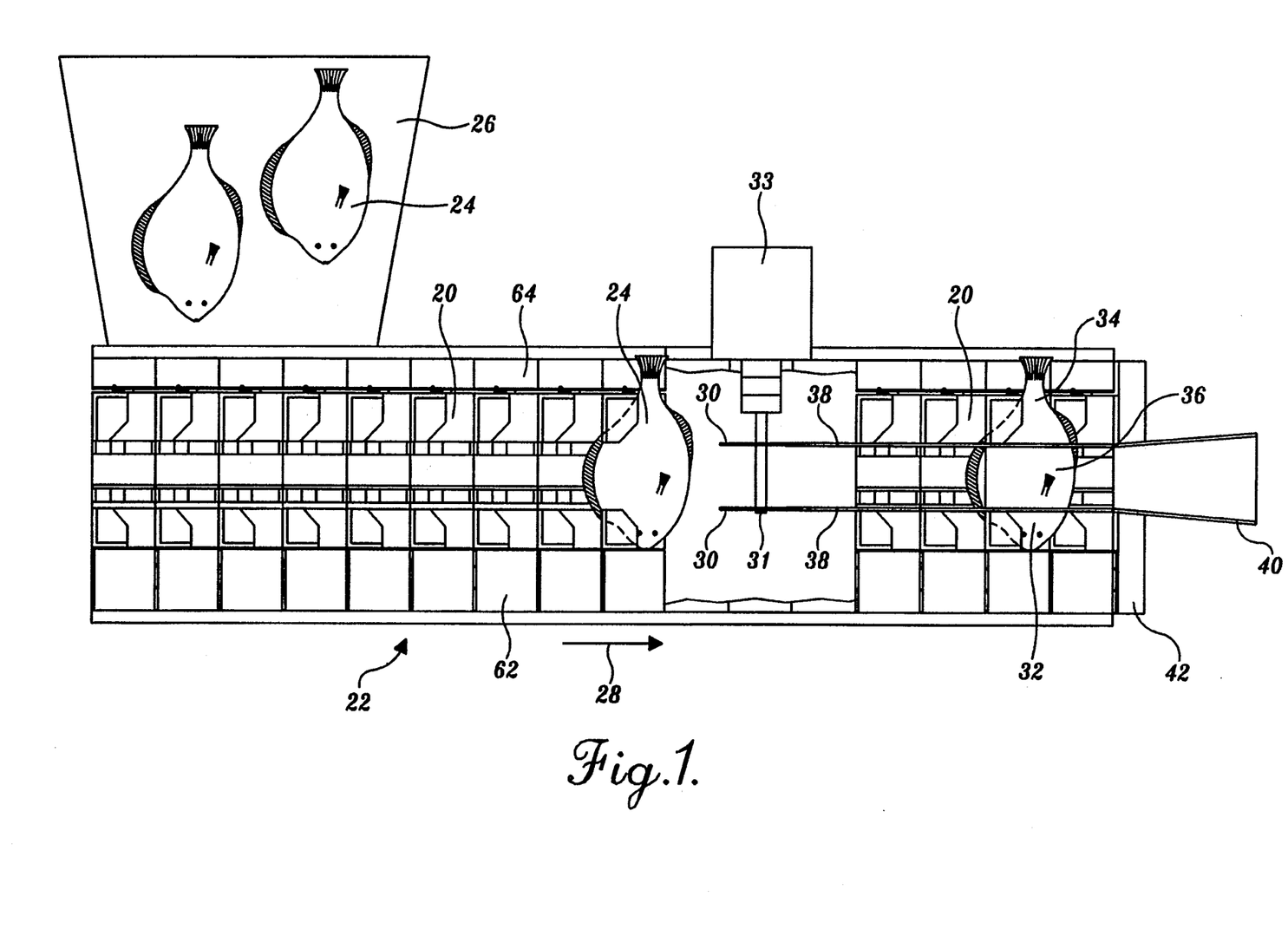
FIG. 1 is a top elevational view of a fish processor that includes fish holders according to present invention.

FIG. 1 illustrates a conveyor 22 of the type used in some processing equipment, as an example, the Baader 182. A plurality of fish trays or holders 20 are attached to a conveyor so that they move from left to right as the conveyor moves. The conveyor 22 can be any continuous belt or similar conveyor driven in any manner well known in the art. In the embodiment shown, the conveyor is driven through the use of a drive roller 53 (FIG. 2), including a series of teeth which engage a chain or drive belt 52. The drive roller is in turn connected to a drive motor (not shown) which in turn could be connected to a control device in order to determine the speed at which the conveyor moves. Although the conveyor is shown as a continuous chain, any suitable type of conveyor could be used.

The drive belt 52 forms a continuous triangular loop, the corners of which are defined by the drive roller 53, support roller 54 and support roller 50. The support roller 54 is located underneath the drive roller 53, and the support roller 50 is located to the left of the drive roller and support roller 54. The drive roller rotates clockwise as shown by arrow 51, causing the upper portion of the conveyor to move to the right as shown in FIG. 1.

A fish hopper 26 is located near the left end of the conveyor and is supplied with a continuous supply of fish from a supply chute (not shown). The fish hopper can be any suitable shape capable of holding fish within reach of a worker. In operation, a worker removes an individual fish 24 from the fish hopper 26 and inserts it into an individual fish holder 20 as described in more detail below. The fish holder helps to center the fish and holds it during processing. After insertion into a fish holder, the conveyor moves the fish to the right as shown by arrow 28 (FIG. 1), such that the fish is brought in contact with two parallel rotating blades 30, as described below. As a fish is moved into contact with the blades, the head 32 and tail 34 of the fish are cut off.

The two blades 30 are mounted on a rotatable shaft 31, that is in turn coupled to a drive mechanism 33. The drive mechanism 33 is any standard drive mechanism capable of driving the shaft and blades at a high RPM so that they may easily cut through the fish. In FIG. 1, the section of the conveyor underneath and adjacent the blades and drive mechanism 33 is not shown in order to more clearly illustrate the location and details of the blades. Similarly, in FIG. 2 the portion of the conveyor adjacent the blades is shown in phantom in order to more clearly illustrate the blades and the divider sheets 38 as described in more detail below.

The rotatable shaft 31 extends partially across the width of the conveyor parallel to the top of the conveyor and perpendicular to the edge of the conveyor. The two blades 30 are circular cutting blades mounted on the shaft at different positions so as to define the width of the center portion 36 of the fish remaining after removing the heads and tails. The blades 30 are mounted normal to the upper surface of the conveyor at a height that allows the lower edge of the blades to extend into two slots in the fish holders (FIG. 2) as described in more detail below. This allows the blades to cut cleanly through the entire thickness of the fish as the conveyor moves them past the blades. The blades 30 may be any suitable blades sharp enough and durable enough to withstand the harsh and corrosive environment in which they operate.

Figure 2:
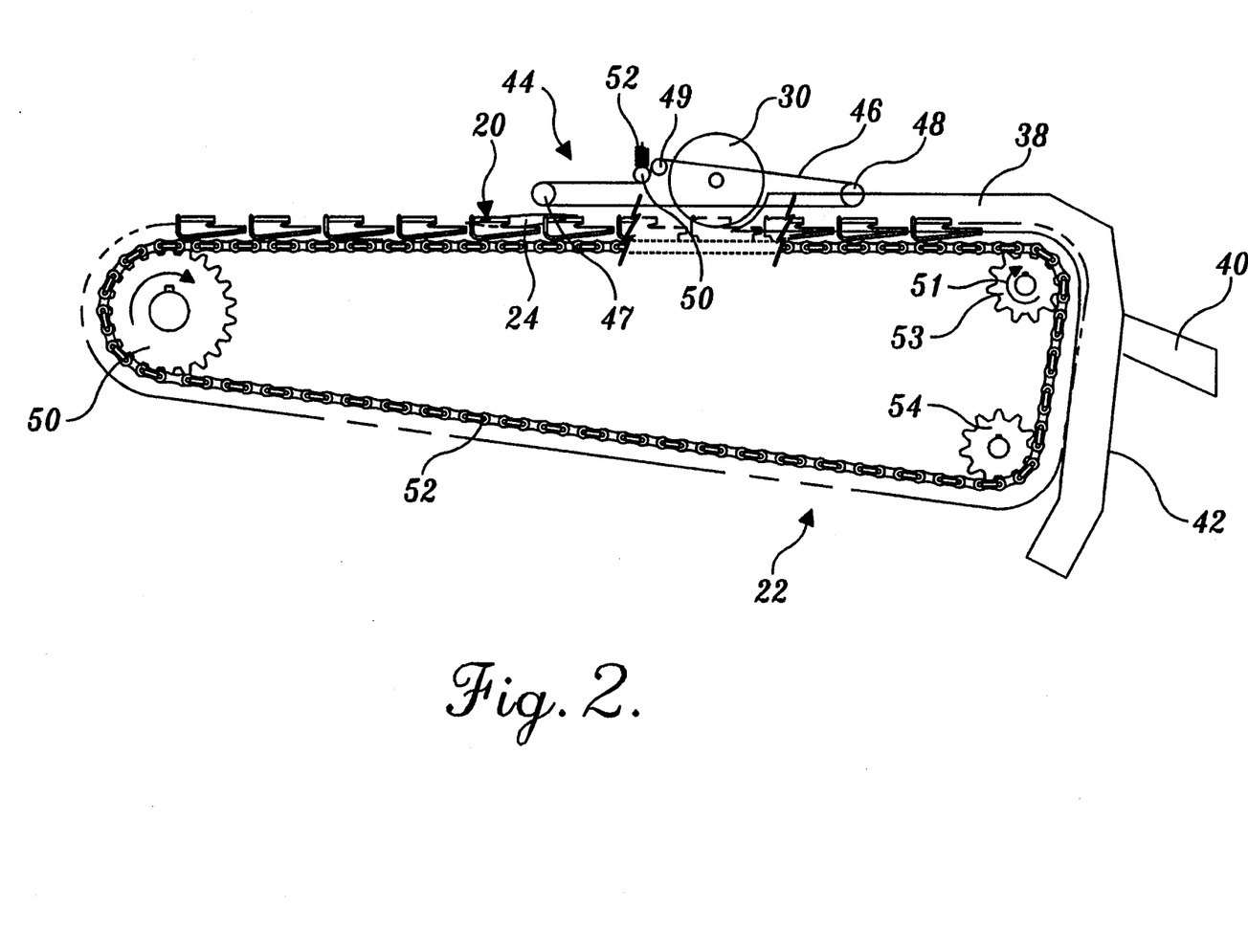
FIG. 2 is a guide elevational view of the conveyor of the fish processor of FIG. 1

In addition to being held by the fish holders, the fish are also held against the conveyor by a hold-down mechanism 44 located above the conveyor. The hold-down mechanism is illustrated in FIG. 2 but has not been shown in FIG. 1 in order to clearly show the blades and drive mechanism. The hold-down mechanism 44 includes a continuous belt or chain 46, that extends to both the left and right of the blades 30. The chain 46 passes downwardly around a support roller 47 located to the left of the blades and then extends parallel to the upper surface of the conveyor, past the blades and under the rotatable shaft. The chain then passes upwardly around another support roller 48 located to the right of the blades to form a continuous loop. The chain 46 also passes over a drive roller 49 located to the left of the blades and under a tension roller located to the left of the driver roller. The chain is maintained at a constant tension by the tension roller which is biased downwardly by a spring bias mechanism 52 in order to maintain the chain taut. The drive roller drives the chain 46 counter clockwise so that the lower portion of the chain parallel to the conveyor moves from left to right at a similar rate as the upper surface of the conveyor. As the fish holders and fish move to the right, they move underneath and contact the lower portions of the chain 46. This results in the chain 46 placing a downwardly directed force on the fish, thus helping to maintain them against the upper surface of the fish holders and conveyor. This in turn helps to ensure that each fish is held in place as the head and tail are removed.

Located just to the fight of the blades are two dividers 38 (FIGS. 1 and 2) that extend in line with and parallel to the blades 30 along the portion of the conveyor to the right of the blades 30. The dividers 38 are flat plates that extend approximately normal to the conveyor beginning slightly from the right of the blades to the end of the conveyor where they form the wails of a center chute 40 (FIGS. 1 and 2). The left end of the dividers begins approximately at the center of the blades and then curves upwardly following the curvature of the blades. The bottom edge of each divider extends into the slots in the conveyors as described in more detail below. After the fish are cut into a head portion 32, center portion 36, and tail portion 34, the conveyor moves the cut up fish into contact with the dividers 38. The dividers 38 are located in line with the blades so that as the fish is moved to the right of the blades, the left end of the dividers slide between the head, tail and center of the fish, thus separating the head and tail from the center of the fish.

As the conveyor continues to move toward the right, the divider sheets guide the center portion 36 of the fish into the center chute 40 and the head and tail portions in a waste chute 42. The center chute, in turn, guides the center portion of the fish to another conveyor and subsequently to further processing equipment (not shown). The waste chute 42 in turn guides the head and tail portions of the fish to a waste conveyor which leads to disposal equipment (not shown). The waste chute 42 and center chute 40 are located at the right end of the conveyor. The center chute 40 is located in the center of the end of the conveyor and its sides are defined by the dividers 38. The center chute extends and downwardly and outwardly from the end of the conveyor (FIGS. 1 and 2) to another conveyor leading to processing equipment (not shown). The waste chute 42 is located on both the right and left of the center chute 40 and extends downwardly from the end of the conveyor to a waste conveyor (not shown).

The center portion 36 of the fish may be sold as is in a product form commonly referred to as "kirimi." Alternatively, the center portion of the fish may be filleted, skinned, and/or deboned by further processing equipment (not shown). Such fillets are often breaded and sold for use in sandwiches or other food preparations.

Figure 3:
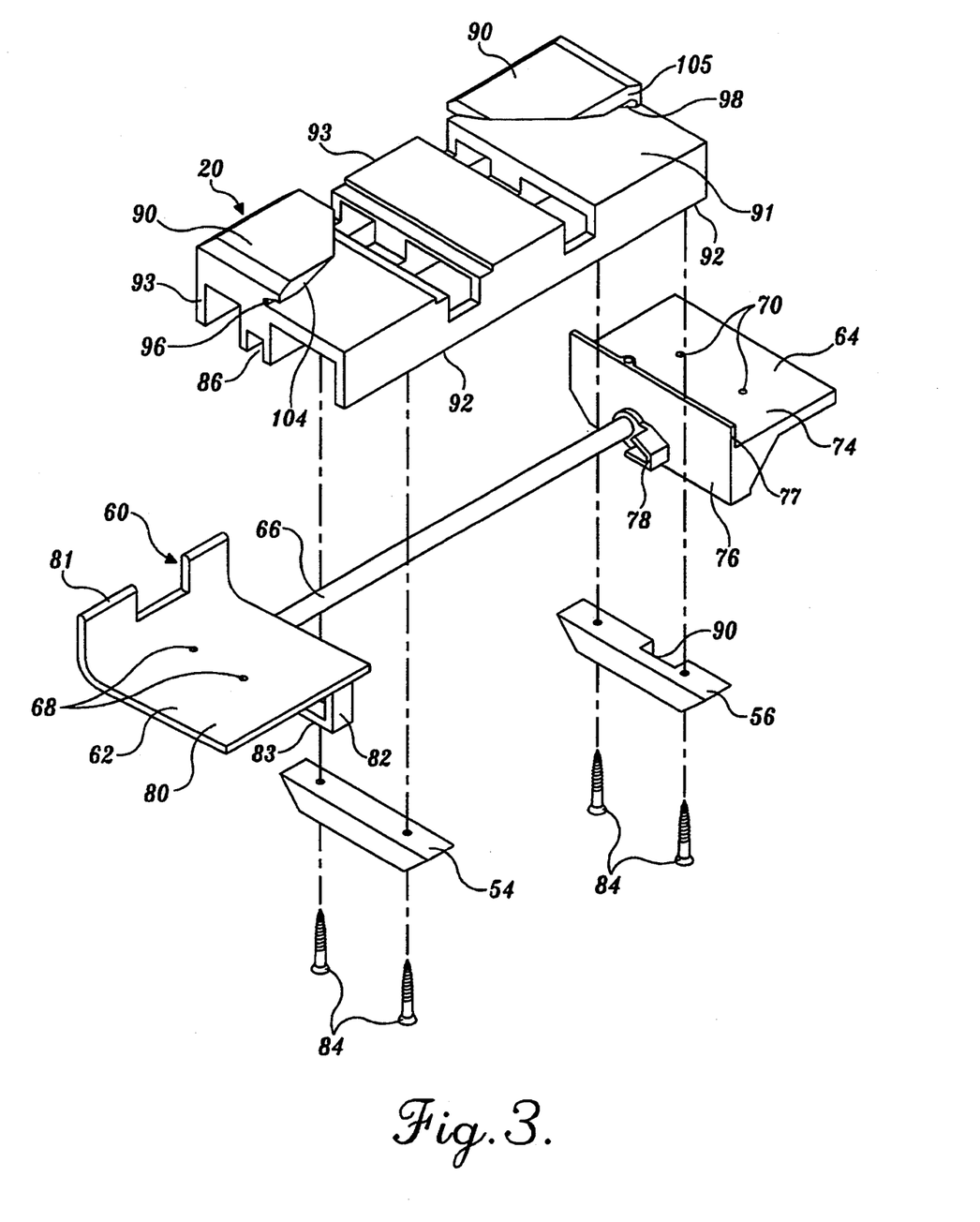
FIG. 3 is a partially exploded view of an individual frame and fish holder of the fish process of FIG. 1.
Figure 4:
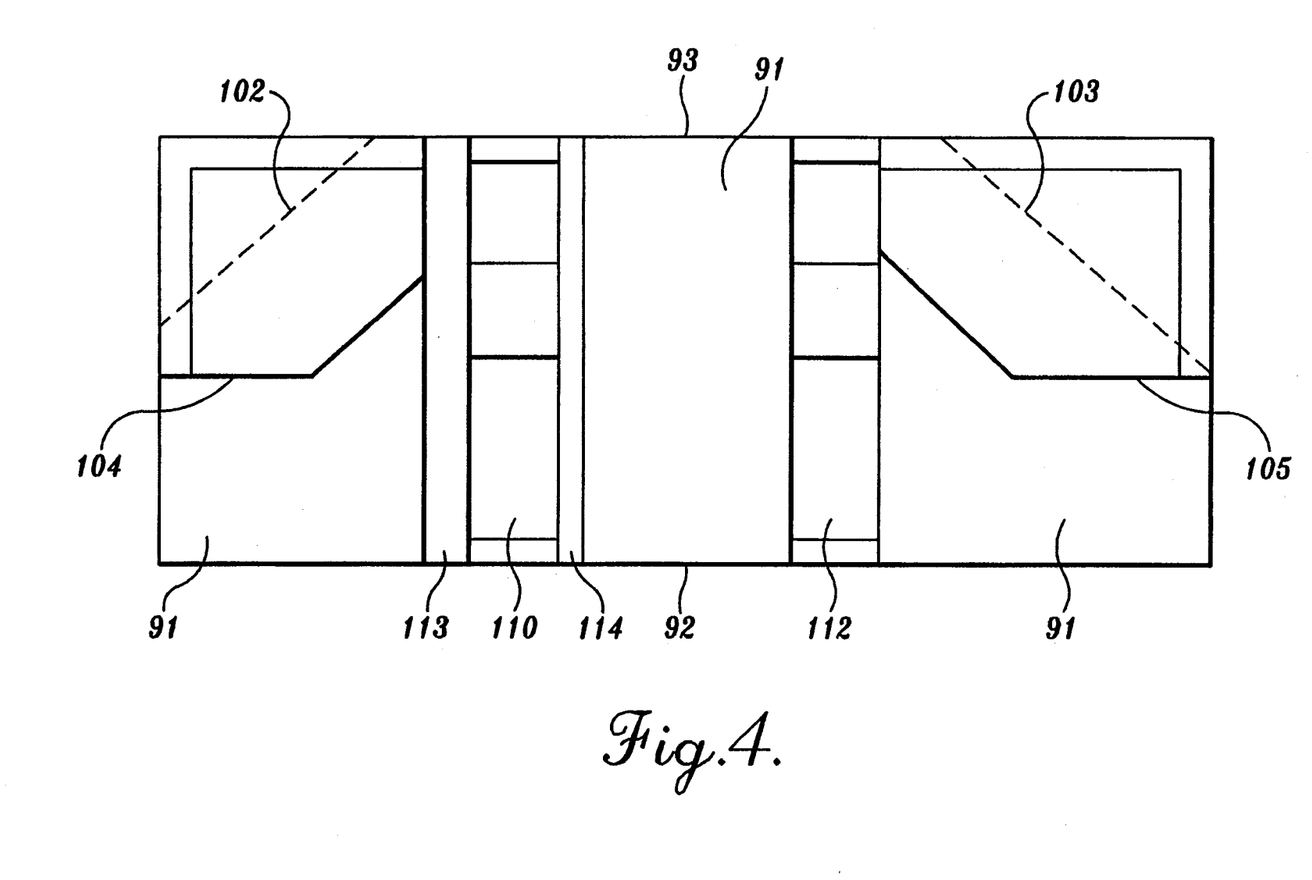
FIG. 4 is a top elevational view of a fish holder of the present invention.

The mechanics and attachment of individual fish holders to the conveyor will now be described. Each fish holder 20 is attached to the conveyor through the use of a support frame 60 (FIGS. 1 and 3). Each support frame includes left and right frame members 62 and 64 longitudinally separated by a rotatable shaft 66 a sufficient distance to allow an individual fish holder to be mounted between the frame members. In the preferred embodiment, the shaft 66 is fixedly secured to the right frame member 64 and rotatably connected to the left frame member 62 as described below.

The right frame member 64 has a generally flat upper surface 74 and an inwardly facing end 76. For the purposes of this description, an inwardly facing surface implies that the surface faces inwardly toward the center of the fish holder and frame while an outwardly facing surface faces away from the center of the fish holder. The end 76 is generally flat and extends perpendicular to the upper surface of the frame member. The shaft 66 is fixedly mounted near the center of the end 76 so as to extend normal to the end. A trapezoidally-shaped detent 78 extends inwardly from the end 76 near the intersection of the shaft 66 and end 76 so as to engage the fish holder as described in more detail below. The right frame member also includes a wall 77 that extends flush with the end 76 upwardly from the upper surface 74.

The left frame member 62 also has a generally flat upper surface 80 that includes an upwardly turned flange 81 located at the rearward edge of the frame member. The right frame member 62 also has a downwardly extending end 82 that faces inwardly toward the fish holder. The shaft 66 extends through an aperture (not shown) in the end 82. The shall 66 is rotatably connected to the left frame member through the use of a screw which extends through the bottom 83 of the end 82 and into the aperture so as to engage a groove in the end of the shaft (not shown) in a manner well known in the art. This allows the left frame member 62 to rotate freely on the shall 66 with respect to the right frame member 64. Both frame members 62 and 64 include apertures 68 and 70 which extend through the respective upper surfaces 74 and 80. The frame members are attached to the conveyor with suitable fastening devices such as screws or bolts that extend through the apertures and into a receiving bracket (not shown) on the conveyor. Each frame 60 is thus attached to the conveyor so that as the frames move with the conveyor, they are free to rotate independently of the adjacent frames.

As best seen in FIGS. 3-8, each fish holder is generally rectangularly shaped to fit between the ends 82 and 76 of the left and right frame members 62 and 64. The upper surface 91 is generally flat and extends parallel to the upper surface of the conveyor. The leading edge 92 and trailing edge 93 of the fish holders extend downwardly normal to the upper surface 91 and longitudinally across the length of the fish holder (FIGS. 3-8). The fish holder also includes a channel 86 which extends longitudinally across the length of the fish holder and downwardly from the upper surface of the fish holder approximately one third of the width of the fish holder from the trailing edge 93. The channel 86 is sized to accept the shaft 66 so that the shaft is enclosed on three sides by the channel 86 while being allowed to rotate freely within the channel.

Figure 5:
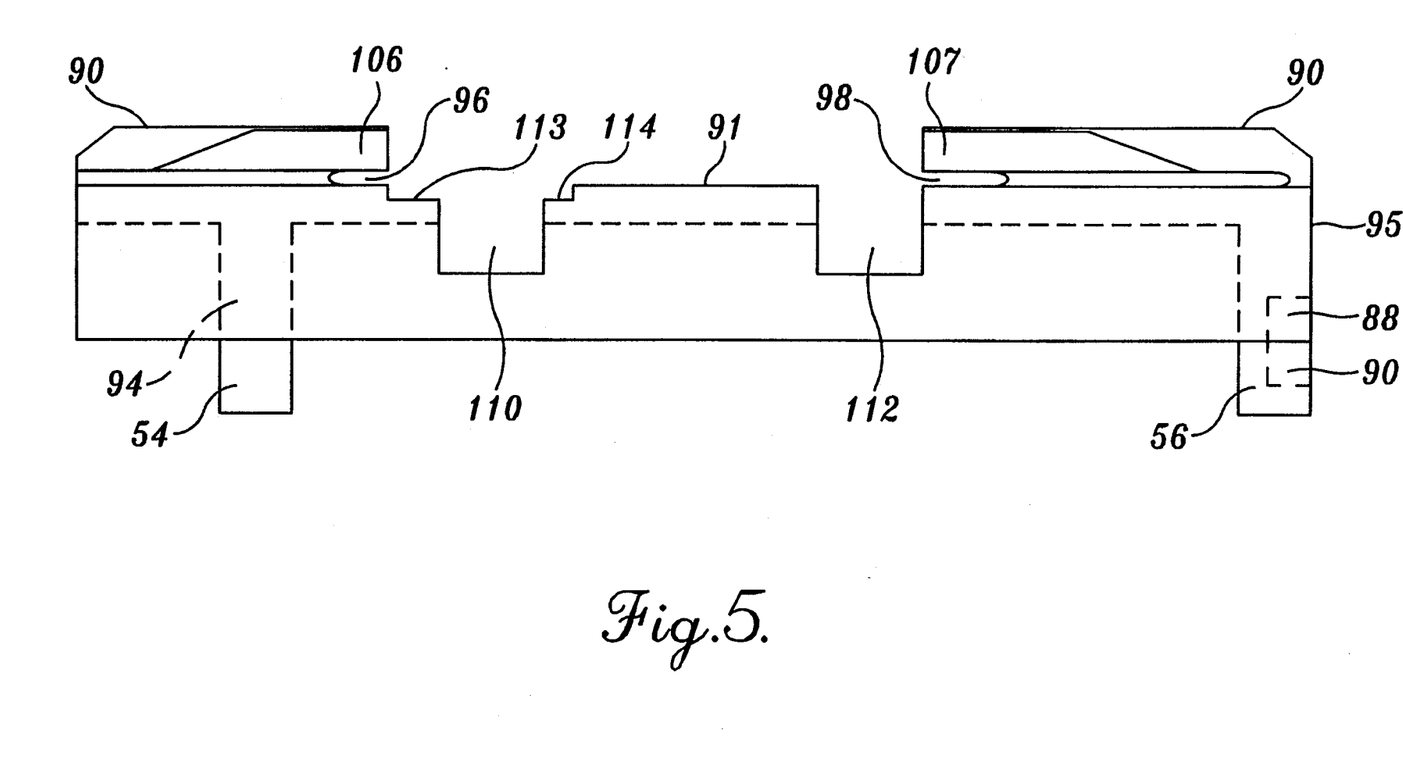
FIG. 5 is a side elevational view of the fish holder of FIG. 4.
Figure 6:
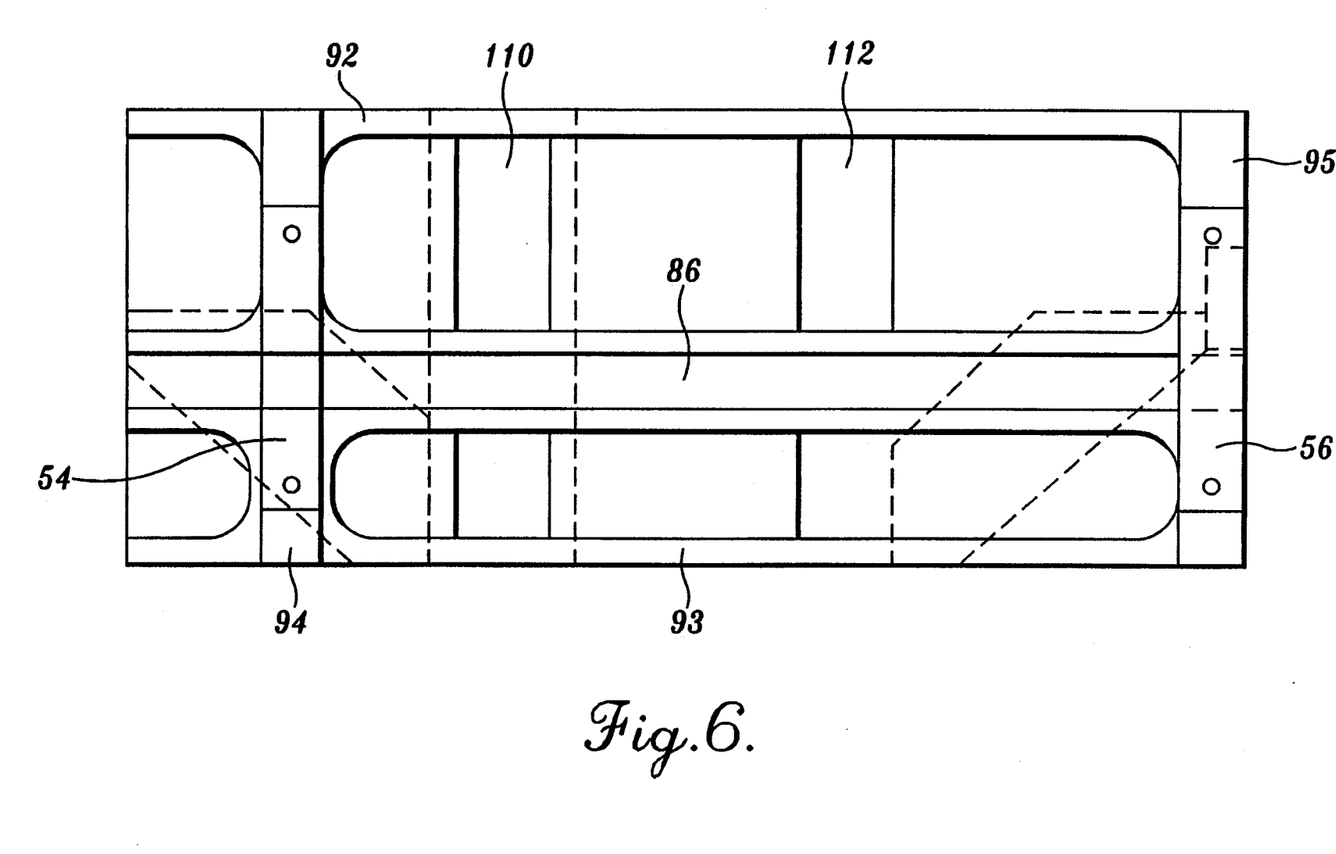
FIG. 6 is a bottom elevational view of the fish holder of FIG 4.
Figure 7:
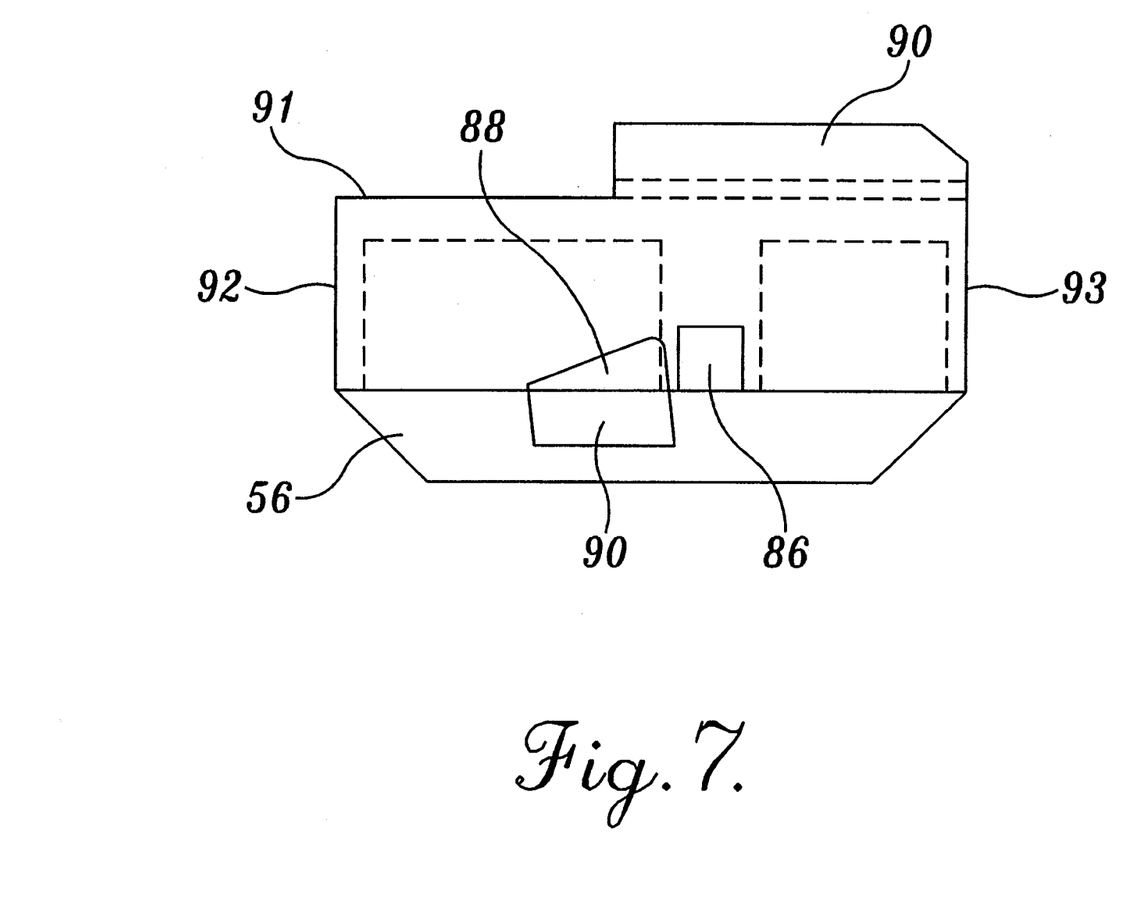
FIG. 7 an end view of the fish holder of FIG. 4.

The fish holder is mounted between the frame members by placing the fish holder on the shaft 66 so that the shaft is maintained within the slot 86. The fish holder is held on the shaft through the use of a left and right retaining brackets 54 and 56, respectively (FIGS. 3 and 5). The left retaining bracket is generally rectangular and extends across the width of the fish holder. The left retaining bracket 54 is attached to a wall 94 that extends across the width of the fish holder near the left end of the fish holder. The wall 94 also extends downwardly from the upper surface 91 flush to the lower edge of the channel 86. The retaining bracket 54 is attached to the wall 94 through the use of fasteners 84 that extend through apertures in the retaining bracket 54 and into the wall 94. The fasteners 84 may be screws, bolts or other suitable fastening devices.

The right end of the fish holder includes a wall 95 (FIGS. 5–7) that extends downwardly from the upper surface flush with a right end of the fish holder. The wall 95 includes a recess 88 located adjacent the slot 86. The recess 88 is configured to conform with and accept the upper portion of the detent 78 extending inwardly from the end of the right frame 64. The right retaining bracket 56 also includes a recess 90 configured to conform with the lower surface of the detent 78 when it is placed in contact with the wall 95. The fight retaining bracket 56 also extends over the top of the shaft 66 in order to capture the shaft within the slot 86. The right retaining bracket is held in place by fasteners 84 which extend through apertures in the retaining bracket and into the wall 95. By capturing and engaging the detent 78, the recesses 88 and 90 ensure that the fish holder does not rotate with respect to the right frame member 64 while allowing it to rotate with respect to the left frame member 62. This ensures that as the right frame members 64 rotates as it travels around the conveyor, the fish holder also rotate a corresponding amount.

The fish holder also includes left and right slots 110 and 112 located near the center of the fish holder and extending across the fish holder normal to the leading and trailing edges. The slots 110 and 112 are parallel and extend downwardly from the upper surface of the fish holder and are sized to allow the blades 30 to pass below the upper surface of the fish holder as each fish holder is moved underneath the blades. This ensures that the blades are able to cut cleanly through the entire thickness of the fish.

Two steps 113 and 114 are located to the lea and the right of the left slot 110 and extend across the width of the fish holder parallel to the slot 110. The steps 112 and 114 form a ledge located just below the upper surface of the fish holder. This allows a support rail (not shown) which extends along the underside of the conveyor (FIGS. 1 and 2) to engage the steps 113 and 114 in order to help support the conveyor and fish holders as they move along the underside of the conveyor.

Each fish holder also includes two hold down brackets, one bracket being located adjacent the left trailing edge of the fish holder and the other bracket being located adjacent the fight trailing edge of the fish holder. Each bracket includes an arm 90 that extends upwardly from the upper surface 91 of the fish holder and inwardly and forward toward the center of the leading edge of the fish holder. The lower surface of the arms 90 define left and right recesses 96 and 98, respectively. The rear wall 102 (as best seen in phantom in FIG. 4) of the left recess is slanted so as to extend from the left end of the fish holder inwardly and across to the trailing edge of the fish holder. Similarly, the rear wall 103 of the right recess extends from the right end of the fish holder inwardly and across to the trailing edge of the fish holder (as best seen in phantom in FIG. 4). In the preferred embodiment, the rear walls 102 and 103 extend at an angle of approximately 45° to the left and right ends respectively and trailing edge of the fish holder. The leading edge 104 of the left arm extends from the left edge of the fish holder parallel to the leading edge of the fish holder approximately half way between the left end of the fish holder and the step 113. The leading edge 104 then slants rearwardly at approximately a 45° angle parallel to the rear wall 102 to the left edge of the step 113. The leading edge 104 then extends rearwardly parallel and in line with the left edge of the step 112 to the trailing edge of the fish holder. Similarly, the leading edge 105 of the right arm extends from the right end of the fish holder parallel to the leading edge of the fish holder approximately half way between the right end and the right edge of the slot 112. The leading edge 105 then slants at approximately a 45° angle parallel to the rear wall 103 to the right edge of the slot 112. It then extends rearwardly parallel and in line with the right edge of the slot 112 to the trailing edge of the fish holder. The portions 106 and 107 respectively of the leading edges of the arms that extends parallel to the rear walls 102 and 103 respectively are beveled from the upper surface of the arm downwardly toward the rear walls. The bevels help to guide the fish into the recesses as described in more detail below.

Figure 8:
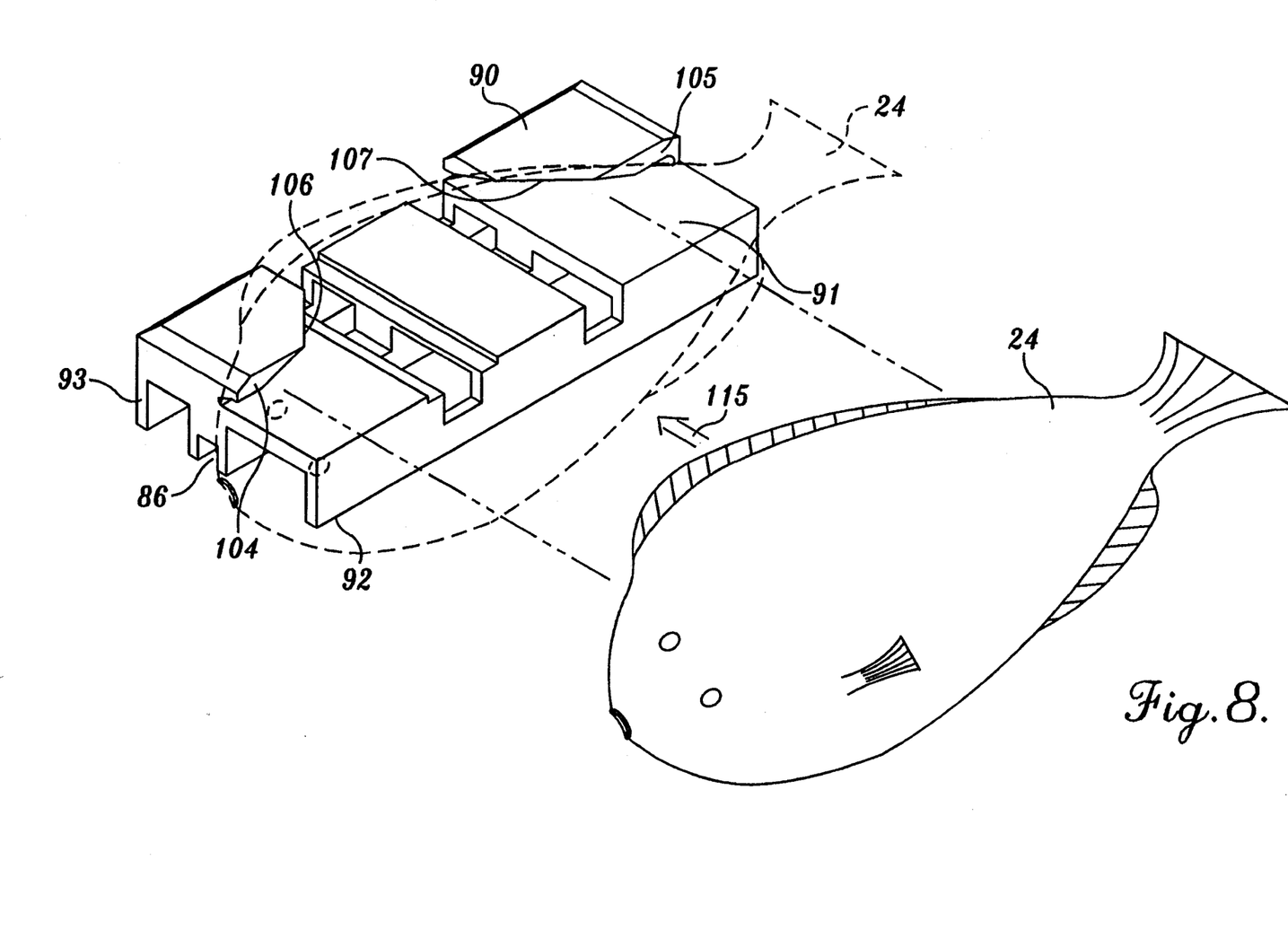
FIG. 8 is a perspective view of the fish holder of FIG. 4 showing the insertion of a sole into the fish holder.

As best seen in FIG. 8, the method of placing and holding a fish within the fish holder will now be described. An individual fish 24, such as a sole (FIGS. 1 and 8), is removed from the fish hopper and slid within a fish holder 20. Each fish 24 is slid underneath the arms 90 into the recesses 96 and 98 as shown by arrow 115. The beveled portions 106 and 107 help guide the fins and body of the fish downwardly under the arms and into the recesses. As each fish is slid under the arms, the slanted rear walls 102 and 103 self-center the fish within the fish holder. Thus, the hold down brackets act as both a centering device and a hold-down device to center and hold the fish within the fish holder. Centering the fish with respect to the center of the fish holder helps to ensure that the fish is in the proper position to remove both the head and tail while leaving the center of the fish.

As the conveyor moves the fish and fish holder underneath the blades, the blades begin cutting off the head and tail portions of the fish. As the fish holder continues its movement under the blades, the blades extend through the slots in the fish holder, thus ensuring that the blades cut completely through the thickness of the fish. While the cutting operation is taking place, the ledges and hold-down mechanism hold the fish down and maintain it in the proper position. After cutting the head and tail portion off, the divider sheets 38 divide the head and tail portions from the center portion as described above.

In addition to creating kirimi, the present invention can be used in combination with additional processing equipment to create fish fillets for sandwiches or other products. In some such products, trapezoidal fillets with slanted edges are desired. An alternative embodiment of the present invention can be used to cut the center portion of the fish at other angles. One of the hold down brackets can be moved forward with respect to the other. In addition, the angle of the rear wall of the recesses can be altered. This allows the fish to be placed within the fish holder at any desired angle while still centering it with respect to the center of the fish holder. Because the fish is held within the fish holder at an angle, the blades cut the head and tail off at an angle producing a trapezoidal center portion. The center portion may then be filleted skinned and deboned to produce a final product.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fish holder for holding and centering a flat fish so that the flat fish may be cut along selected paths, the fish holder comprising:
   a) a tray having an upper surface upon which the flat fish rests while being cut up; and
   b) first and second stationary arms extending upwardly from the tray and extending over at least part of the upper surface, the flat fish being secured between the upper surface and the first and second arms, the first and second arms including opposing slanted and beveled rear walls angled so as to define a recess that guides the flat fish between the first and second arms and the upper surface, and simultaneously centers the flat fish lengthwise within the recess as the flat fish is placed in the fish holder.

2. The fish holder of claim 1, further comprising slot means in the tray, the slot means extending into the upper surfacing for allowing a cutting blade to pass through a fish holding region and below the upper surface, thereby allowing the cutting blade to pass entirely through the flat fish as the fish holding and cutting blade move relative to one another.

3. The fish holder of claim 2, wherein the slot means includes first and second parallel, horizontally spaced slots located so as to allow the cutting blade to pass through the fish holding region at two predetermined locations so as to sever the head and tail of the flat fish.

4. The fish holder of claim 1, wherein the first and second arms are located near opposite ends of the fish holder, one arm extending upwardly from the upper surface and over part of a head portion of the flat fish, the other arm extending upwardly from the upper surface and over a tail portion of the flat fish.

5. A fish holder for holding and centering a flat fish so that the flat fish may be cut up, the fish holder comprising:
   a) a body having an upper surface upon which the flat fish rests, the upper surface including at least one slot so as to allow a cutting blade to extend through the upper surface so as to allow the cutting blade to pass entirely through the flat fish; and
   b) a holding structure including first and second stationary arms extending upwardly from the body and over at least part of an edge of the flat fish so as to hold the flat fish adjacent the upper surface, the holding structure including opposing slanted and beveled rear walls angled so as to define a recess that guides the flat fish between the first and second arms and the body, and simultaneously centers the flat fish lengthwise within the recess as the flat fish is placed in the fish holder.

6. The fish holder of claim 5, wherein the body includes two parallel, horizontally spaced slots located so as to allow a cutting blade to pass through the upper surface at two locations so as to cut the head and tail of the flat fish off.

7. The fish holder of claim 5, wherein the first and second arms are located near opposite ends of the fish holder, one arm extending upwardly from the upper surface and over part of a head portion of the flat fish, the other arm extending upwardly from the upper surface and over a tail portion of the flat fish.

8. In a fish processing machine of the type having conveyor means, fish holders coupled to the conveyor means, and cutting means for cutting up the fish placed on the fish holders, the improvement comprising a fish holder for holding a flat fish so that the flat fish may be cut up, the fish holder including:
   an upper surface upon which the flat fish is placed to be cut up;
   holding means, including first and second stationary arms, defining a recess, extending upwardly from the upper surface and over at least part of the flat fish for simultaneously securing the flat fish in the fish holder, guiding the flat fish into the recess, and centering the flat fish lengthwise between opposing slanted rear walls of the first and second arms as the flat fish is placed in the fish holder.

9. The improvement of claim 8, further comprising slot means for allowing the cutting means to pass through a portion of the upper surface so as to allow the cutting means to pass entirely through the flat fish.

10. The fish holder of claim 8, wherein one of the arms extends upwardly from the upper surface over part of a head portion of the flat fish, and the other arm extends upwardly from the upper surface over a tail portion of the flat fish.

11. The fish holder of claim 8, wherein the rear walls of the recesses are slanted at complementary angles so as to center the flat fish as it is placed on the fish holder.

12. The improvement of claim 9, wherein the slot means includes two parallel, horizontally spaced slots located so as to allow the cutting means to pass through the upper surface at two locations so as to cut the head and tail of the flat fish off.

13. A method for holding and centering a flat fish on a fish holder so that the flat fish may be cut along selected paths, the method comprising the steps of:
   a) placing the flat fish on an upper surface of the fish holder upon which the flat fish rests while being cut up;
   b) simultaneously guiding the flat fish at least partially between the upper surface and first and second stationary arms extending upwardly from the fish holder over at least part of the upper surface and centering the flat fish lengthwise between opposing slanted rear walls of the first and second arms as the flat fish is placed on the fish holder; and
   c) holding the flat fish between the upper surface of the fish holder and the first and second arms while the flat fish is cut up.

14. The method of claim 13, further comprising cutting the head and tail of the flat fish off to form kirimi.

15. The method of claim 13, wherein the opposing slanted rear walls are also beveled and the guiding step further comprises guiding the flat fish along the slanted and beveled walls to center and secure the flat fish.

* * * * *

UNITED STATES PATENT AND TRADEMARK OFFICE
CERTIFICATE OF CORRECTION

PATENT NO. : 5,358,441

DATED : October 25, 1994

INVENTOR(S) : J. Hjorth

Page 1 of 2

It is certified that error appears in the above-identified patent and that said Letters Patent is hereby corrected as shown below:

| COLUMN | LINE | |
|---|---|---|
| 1 | 22 | "cod. etc." should read --cod, etc.-- |
| 1 | 68 | "off The" should read --off. The-- |
| 3 | 39 | "to present" should read --to the present-- |
| 3 | 41 | "guide" should read --side-- |
| 3 | 44 | "process" should read --processor-- |
| 3 | 51 | "7 an" should read --7 is an-- |
| 5 | 27 | "fight" should --right-- |
| 5 | 33 | "wails" should read --walls-- |
| 6 | 38 | "shall 66" should read --shaft 66-- |
| 6 | 44 | "shall 66" should read --shaft 66-- |
| 7 | 28 | "fight" should read --right-- |

UNITED STATES PATENT AND TRADEMARK OFFICE
CERTIFICATE OF CORRECTION

PATENT NO. : 5,358,441
DATED : October 25, 1994
INVENTOR(S) : J. Hjorth

It is certified that error appears in the above-indentified patent and that said Letters Patent is hereby corrected as shown below:

Column 7, line 50, "lea" should read --left--

Signed and Sealed this

Fourteenth Day of February, 1995

Attest:

BRUCE LEHMAN

Attesting Officer

Commissioner of Patents and Trademarks